United States Patent Office 3,300,975
Patented Jan. 31, 1967

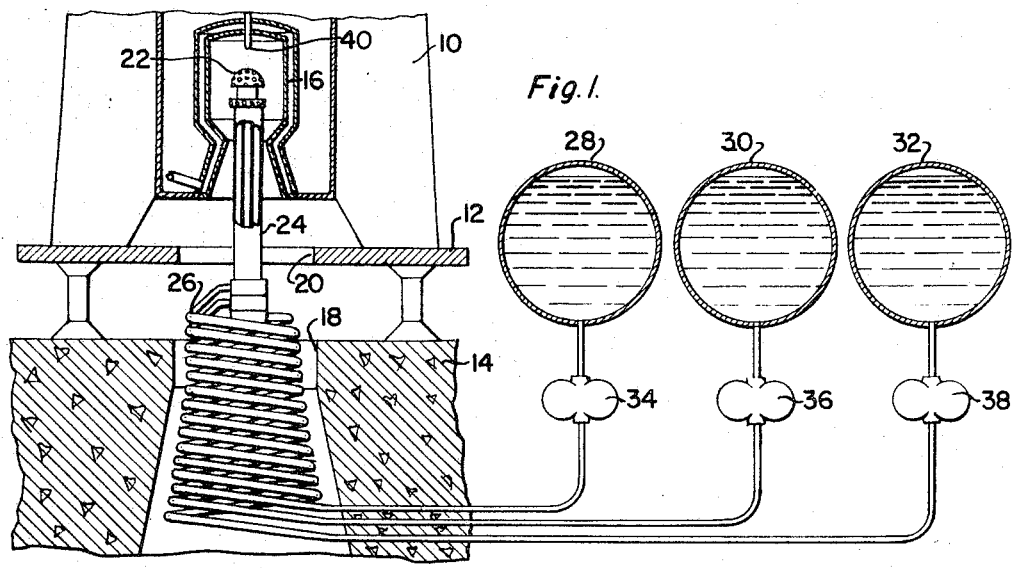
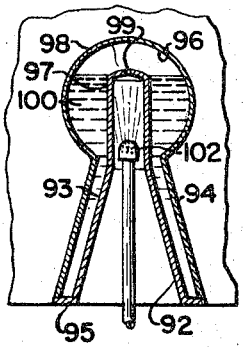
Fig. 1.
Fig. 2.
INVENTOR.
Orville R. Seidner

3,300,975
PROTECTIVE APPARATUS FOR A ROCKET MOTOR
Orville R. Seidner, Alhambra, Calif., assignor to The Garrett Corporation, Los Angeles, Calif., a corporation of California
Original application June 13, 1955, Ser. No. 515,183, now Patent No. 2,962,934. Divided and this application May 10, 1965, Ser. No. 454,307
10 Claims. (Cl. 60—207)

This invention relates to vehicle propulsion in general, and particularly relates to propulsion apparatus peculiarly adaptable to vehicles of the rocket type.

This application is a division of my earlier application Serial No. 515,183, filed June 13, 1955, now Patent No. 2,962,934, for Vehicle Propulsion Apparatus, and of my application Serial No. 73,022, filed December 1, 1960, now Patent No. 3,182,593, itself a division of my aforesaid application Serial No. 515,183.

Rocket propulsion is divided into three broad phases: (1) getting the rocket off the ground and on its way, (2) accelerating the rocket through the dense atmosphere in the lower altitudes, and (3) propelling the rocket thereafter. Since the rocket customarily must carry its own fuel for all three phases, it is readily seen that the success of the third phase is governed almost solely by the economies effected in the first and second phases.

In the prior art it has been customary to provide liquid fuel and oxidant tanks within the rocket vehicle to supply the fuel nozzles in the motor thereof. Since a considerable portion of the fuel is consumed in the first and second phases above-mentioned, it is readily seen that any economies that can be effected in those phases will have beneficial affects on the range or payload of the rocket because the fuel thus saved is then available for the third and most important phase.

In order to effect such economies it has been proposed to add a booster stage or stages to the payload rocket to lift the payload stage and accelerate it through the dense air in the lower reaches of the atmosphere. For example, it is stated in Rockets, Missiles, and Space Travel, by Willey Ley, published by the Viking Press, in 1952, that the "WAC-Corporal" in solo flight (with a booster) attained an altitude of about 43.5 miles and the "V-2" rocket attained a solo altitude of 114 miles, but when the WAC-Corporal was staged by the V-2 it reached 250 miles altitude. Of particular note is the fact that the V-2 required about 4½ tons (dry weight) plus about 10 tons of fuel to stage the WAC-Corporal. Of the dry weight mentioned the rocket motor weighed one ton approximately.

Obviously, the dry weight of the booster stage constitutes a penalty since it represents, in effect, a "deadhead passenger" taken along for the ride.

I have discovered means for decreasing the dry weight of the booster auxiliary stage of a rocket vehicle. I have also discovered means for providing starting assist to a single stage rocket. Both discoveries are based upon the principle that a rocket motor is ignorant of and not particular about the source of the fuel fed to it, and that auxiliary means may be provided for furnishing external fuel either to the rocket motor nozzle or to nozzle means apart from the included motor nozzle to furnish thrust to the motor, hence to the rocket vehicle.

Therefore, the present invention is concerned with the first and second phases of rocket propulsion. Primarily, the invention as described and claimed in the aforesaid applications has for its object the provision of methods and means for providing an auxiliary boost in the launching of a rocket whereby the fuel usually expended in getting the rocket off the ground is conserved for use in the later phases. Another object is to provide auxiliary assist propulsion apparatus which will allow conservation of the fuel in a rocket during the first and second stages of its flight. A more particular object of the present application is to provide a protective arrangement for the interior surface of a rocket motor during the initial thrust buildup. Specifically, an object is to provide a disintegrable or expendable liner disposed adjacent at least a portion of the interior surface of a rocket motor. Another object is to provide the nozzle of a rocket motor with a liner as aforesaid. Yet another object is to provide a liner adjacent to but spaced somewhat from the interior of a rocket motor whereby the jacketed space between the motor surface and the liner may be filled substantially with a liquid, such as water for example, having a relatively large heat of vaporization. Other more specific objects will be apparent at once upon a consideration of the drawings when examined in the light of the description which follows.

FIG. 1 is an elevation view, partly schematic and partly in cross section showing the tail section of a rocket resting on its launching platform, one embodiment of the invention being shown in connection with the rocket motor; and FIG. 2 is a cross-sectional view of one form of rocket motor, showing a method of protecting the combustion chamber and throat of the motor.

Referring to FIG. 1, the tail section 10 of a rocket is shown as resting on a launching platform 12 supported on the concrete apron 14 of the rocket launching site. For purposes of simplification of the description, the rocket is depicted as being provided with a single motor 16, although it will be apparent that a plurality of motors may be used, with any or all of them having the invention applied thereto.

The apron 14 is provided with an opening 18 which may lead to an underground exhaust muffling chamber (not shown) if desired. The table 12 is provided with a similar opening 20 through which the exhaust from the motor 16 may pass.

Extending up through the exhaust nozzle and into the combustion chamber of the motor 16 is a fuel nozzle 22 disposed on the end of a pipe 24 whose lower end has a connection with the three coils of a regenerative heat exchanger 26, the opposite ends of the coils being in communication with the tanks 28, 30, and 32 through the pumps 34, 36, and 38, respectively. Tank 28 contains fuel, tank 30 contains oxidant, and if the third tank 32 is employed it may contain water, or alcohol, for example, or any other fluid the use of which will enhance the thermodynamic reaction between the fuel oxidant in the combustion chamber of the motor 16.

The motor 16, of course, is provided with the usual fixed fuel nozzles (not shown) having connections with the fuel and oxidant tanks (likewise not shown) in the rocket proper.

When it is desired to fire the rocket, the igniter 40 of the motor is energized, after which the pumps 34, 36, and 38 may be started to furnish fuel and oxidant (and water, if desired) to the nozzle 22. The firing of the externally supplied fuel and oxidant results in products of combustion whose thrust force is exerted on the rocket motor so as to give it a thrust. When the thrust exceeds the weight of the rocket, the rocket will move upwardly and leave the launching site. It goes without saying that the fuel and oxidant carried by the rocket must be turned on in order to sustain the flight of the rocket. If the internal rocket fuel is fed to the motor fuel nozzles while the external fuel is fed to the nozzle 22, it is apparent that the initial thrust will be increased by that much. In any event, it is apparent that the rocket fuel should be providing thrust to the rocket before the upward velocity of the rocket decreases too much.

In rocket motors an intense heat is generated in the combustion chamber by the burning fuel. It has been suggested that the combustion chamber, the throat, and the motor exhaust nozzle could be protected to some extent by providing a jacket around them to provide an intermediate space through which the fuel or oxidant could be conducted, in heat exchange, upstream from the fuel or oxidant nozzles. Patent No. 2,695,496 shows such a structure.

In the practice of the present invention, as depicted by FIG. 1, it is evident that no protective heat transfer will take place, since there is no flow of fuel and/or oxidant through the jacketed space of the motor 16 during the initial thrust buildup occasioned by the firing of the fuel supplied through the nozzle 22. Therefore, it is proposed, as shown in FIG. 2, to provide an expendable liner 92 within the exhaust nozzle 94 and the combustion chamber 96 of the motor 98. The liner 92 comprises a wall portion 93 shaped generally in the form of a frustum to conform to the configuration of the exhaust nozzle 94 of the motor 98. The annular flanged portion 95, extending radially from the larger open end of the frustum portion 93, is adapted to engage and form a seal with the inner wall of the exhaust nozzle 94 adjacent the lower end of the motor 98. The upper end of the wall 93 is substantially closed by a capped cylindrical portion 97 which extends upwardly from the smaller end of the frustum, the capped end being provided with an orifice 99 for equalization of pressures on each side of the liner 92. As shown, the cylindrical portion extends well into the combustion chamber 96 of the motor 98. The liner may be fabricated of lead, for example, or any other material which is readily disintegrated by the heat in the motor 98 when it is being fired.

The space 100 between the liner 92 and the inner walls of the motor 98 constitutes a jacketed chamber which may be nearly filled, for example, with water which will be converted to steam upon ignition of the fuel and oxidant issuing from the fuel nozzle 102. As the heat builds up in the combustion chamber the liner 92 melts or crumbles, according to the nature of the expendable material from which it is fabricated with a portion of the heat being utilized to convert the water to steam and to melt the liner. In that manner the combustion chamber and throat are protected during the initial buildup of thrust from the combustion of the fuel.

It will now be seen that the invention comprises, in its broadest general aspects, means for providing protection to the interior surface of a rocket motor during that initial portion of its operation when otherwise effective heat transfer means is not operative or is otherwise ineffective. The arrangement disclosed is not intended to limit the invention to the mere details which have been described.

I claim:

1. A method of providing thrust during the initial phase of flight of a vehicle having a rocket motor with an exhaust nozzle and having a heat disintegrable liner in said exhaust nozzle comprising: injecting propellants from a first source independent of said vehicle into said liner, burning said propellants in said liner to produce thrust, operating said rocket motor from a second propellant source in said vehicle after said liner has been disintegrated by heat from said burning propellants, whereby said liner protects said exhaust nozzle while initial thrust is being generated.

2. Protective heat transfer means for a rocket motor having a propellant nozzle therein connected with a propellant supply conduit arranged in heat exchange relation with said rocket motor comprising a liner within said rocket motor and spaced from the walls of said motor; means connecting said liner with the side walls of said rocket motor; said liner being composed of a material which disintegrates with the application of heat of combustion of propellants; means independent of said propellant conduit for supplying propellants to the interior of said liner; said liner and said independent propellant supply means being operable for producing thrust before operation of said rocket motor.

3. Protective heat transfer apparatus for a rocket motor in accordance with claim 7 wherein said liner and the side walls of said motor cooperate to form a substantially enclosed space therebetween.

4. In a liquid propellant rocket having a combustion chamber, cooling means for the wall of said combustion chamber, a main propellant nozzle associated with said cooling means, an auxiliary nozzle injecting additional propellants into said combustion chamber to generate initial thrust, an expendable liner surrounding said auxiliary nozzle and spaced from said combustion chamber wall, said liner being disintegrable by the heat of combustion of said additional propellants to protect said wall during initial thrust buildup.

5. The rocket according to claim 4 wherein said liner and said chamber wall form a liquid container, and liquid coolant in said liquid container.

6. The rocket according to claim 5 including means for venting said liquid container to the opposite side of the liner.

7. Protective heat transfer means for a rocket motor in accordance with claim 2 wherein said liner includes means for equalizing pressure on opposite sides of said liner.

8. Protective heat transfer means for a rocket motor in accordance with claim 2 wherein said liner is composed of lead.

9. Protective heat transfer apparatus for a rocket motor in accordance with claim 3 wherein the enclosed space between the side walls of said rocket motor and said liner is filled with a liquid to a level slightly below the means in said liner whereby an equalization of pressure on opposite sides of said liner is effectuated.

10. Protective heat transfer apparatus for a rocket motor in accordance with claim 9 wherein water is utilized as the liquid for filling the enclosed space between the side walls of said rocket motor and said liner.

References Cited by the Examiner

UNITED STATES PATENTS

| | | | |
|---|---|---|---|
| 2,206,057 | 7/1940 | Skinner | 60—35.6 |
| 2,526,222 | 10/1950 | Goddard. | |
| 2,671,313 | 3/1954 | Laramee | 60—35.6 |
| 2,791,883 | 5/1957 | Moore et al. | 60—35.6 |
| 2,912,820 | 11/1959 | Whitmore | 60—35.6 |

FOREIGN PATENTS 61,977   12/1954   France.

MARK NEWMAN, *Primary Examiner.*

D. HART, *Assistant Examiner.*